United States Patent [19]

Rainville

[11] 4,120,924

[45] Oct. 17, 1978

[54] METHOD FOR MAKING FOAMED BLOWN WARE

[75] Inventor: Dewey Rainville, Westfield, N.J.

[73] Assignee: Rainville Company, Inc., Westfield, N.J.

[21] Appl. No.: 789,832

[22] Filed: Apr. 22, 1977

[51] Int. Cl.² .................. B29G 7/02; B29D 27/00; B29F 5/00
[52] U.S. Cl. .................. 264/45.5; 264/40.3; 264/89; 264/DIG. 1; 264/DIG. 14; 425/4 R; 425/522
[58] Field of Search .......... 425/535, 541, 4 R, 817 R, 425/522, DIG. 231, DIG. 812, 155, 157, 387.1, 388; 264/DIG. 1, DIG. 13, DIG. 14, 40.3, 101, 4, 89, 90, 97, 455; 65/263

[56] References Cited

U.S. PATENT DOCUMENTS

| | | | |
|---|---|---|---|
| 2,467,000 | 4/1949 | Samuelson | 65/263 |
| 3,078,508 | 2/1963 | Martin, Jr. | 425/535 |
| 3,583,036 | 6/1971 | Brown | 425/535 Y |
| 3,588,952 | 6/1971 | Wilson et al. | 425/DIG. 231 |
| 3,667,887 | 6/1972 | Reiss | 425/540 |
| 3,814,783 | 6/1974 | Dardaine et al. | 425/527 X |
| 3,901,958 | 8/1975 | Doll | 264/DIG. 1 |
| 3,970,732 | 7/1976 | Slaats | 425/812 X |
| 4,026,982 | 5/1977 | Dardaine et al. | 264/90 |
| 4,034,036 | 7/1977 | Farrell | 425/522 X |

FOREIGN PATENT DOCUMENTS 4,628,676 4/1967 Japan .................. 264/DIG. 1

OTHER PUBLICATIONS

Blow Molding Expandable Polystyrene, Goldsberry et al., SPE Journal, Apr. 1962, pp. 448–454.
Blow Foam Bottles, Cleereman et al., Plastics Technology, Oct. 1969, pp. 48–51.

*Primary Examiner*—Francis S. Husar
*Assistant Examiner*—William R. Briggs
*Attorney, Agent, or Firm*—Roy C. Hopgood; John M. Calimafde; Charles W. Neill

[57] ABSTRACT

Plastic blown ware is made by expanding a molten plastic tubular blank into contact with the wall of a mold cavity. This invention evacuates air from the part of the cavity around the outside of the blank to increase the pressure differential across the tube wall during the blowing period and to help prevent the plastic from pulling away from the cavity wall during cooling and shrinkage. The invention makes blown ware by compounding the plastic with a blowing agent and by controlling the bubble size and wall thickness by changing the pressure on opposite sides of the blown article to whatever pressure will permit the gas bubbles and the plastic to expand to the desired size during cooling and setting of the plastic.

2 Claims, 4 Drawing Figures

METHOD FOR MAKING FOAMED BLOWN WARE

BACKGROUND AND SUMMARY OF THE INVENTION

A molten parison on a core rod of an injection blow molding machine can be blown into contact with the wall of the blowing mold cavity more quickly if the air pressure outside of the parison is a partial vacuum. This is particularly true in large mold cavities where there is a substantial amount of air which must be displaced from the cavity by the expanding parison. A partial vacuum in the blowing mold between the article being blown and the wall of the cavity helps prevent the plastic from pulling away from contact with the wall of the cavity as the plastic cools and shrinks. By maintaining closer contact of the plastic with the wall, the blown article cools faster and can be ejected from the blowing mold after a shorter cooling period.

Another feature of this invention is the making of blown ware with foamed or expanded plastic. By putting foaming agent in the plastic, a myriad of closed gas cells are formed in the plastic, and these cells are extremely small as long as the plastic is under the high injection pressure of an injection molding machine, but the gas cells expand in size as the pressure decreases, and this increases the thickness of the plastic that forms the parison on the core rod.

When the plastic material is in the blowing mold, this invention controls the size of the bubbles by changing the difference in pressure on the inside and outside of the blown article. The size to which the gas cells will expand depends on the pressure to which they are subjected while the plastic is in a molten condition. This pressure can be reduced by drawing a partial vacuum in the blowing mold around the outside of the plastic parison as it expands during the blowing operation.

The final size of the gas cells depends on the pressure differential across the wall of the blown article at the time that the plastic solidifies and the size of the gas cells becomes set.

The preferred embodiment of the invention involves injection molding; but the invention can also be used for extrusion molding.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
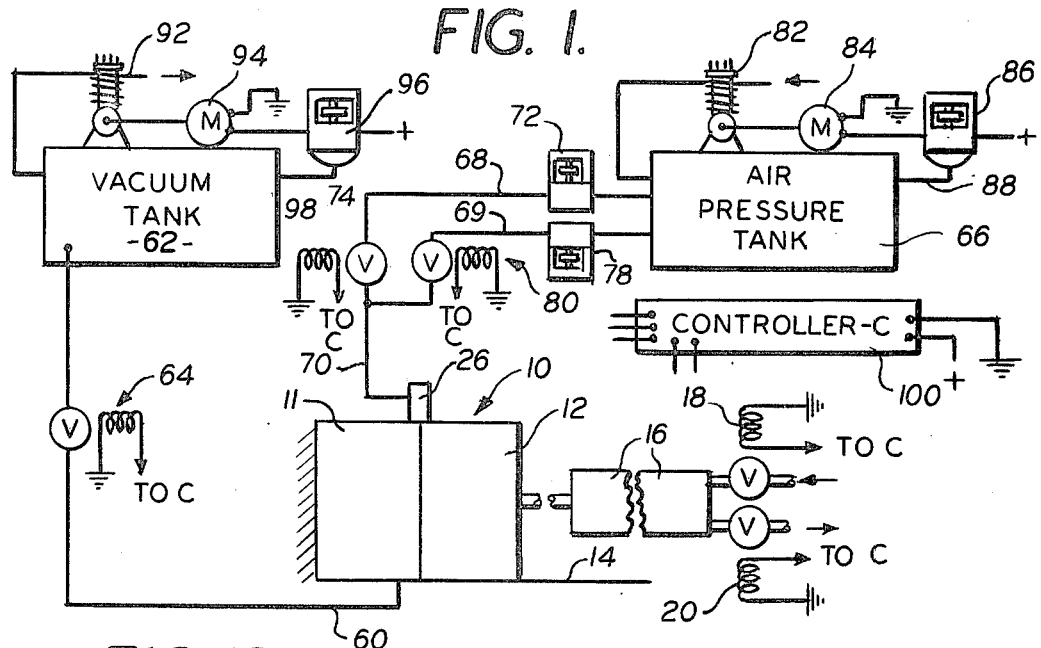
FIG. 1 is a diagrammatic view of apparatus for controlling the pressure on opposite sides of a blown article in an injection mold cavity.

FIG. 1 shows a blowing mold 10 which may be of conventional construction with a fixed section 11 and a movable section 12 which moves toward and from the fixed section 11 to close and open the mold. The fixed section 12 moves along a guide 14 and is actuated by a cylinder and piston hydraulic motor 16. Solenoid operated valves 18 and 20 control the supply and exhaust of working fluid to and from the motor 16.

Figure 3:
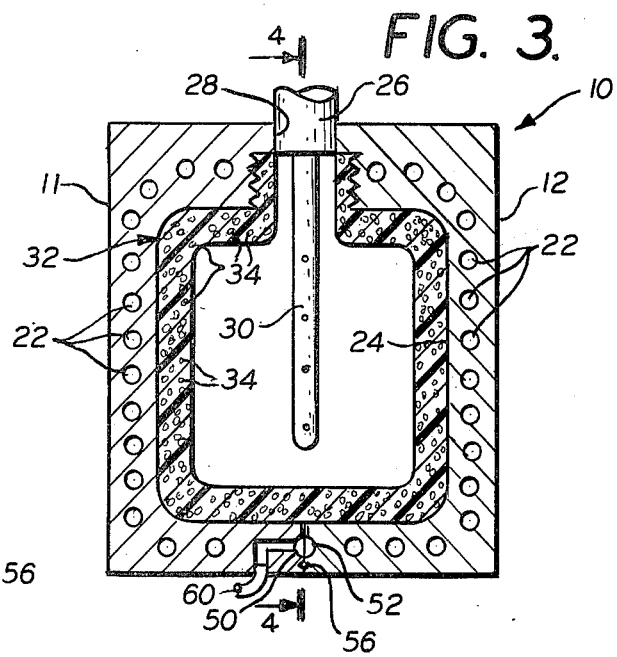
FIG. 3 is a greatly enlarged sectional view of the blowing mold shown in FIG. 1.

FIG. 3 is a sectional view of the blowing mold 10. Both of the mold sections 11 and 12 are shown with chambers 22 through which cooling fluid is circulated to control the temperature of the wall of the cavity of the mold 10. The wall is designated in FIG. 3 by the reference character 24.

A core rod 26 extends into the cavity of the mold 10 and is gripped by the cylindrical wall of an opening 28 which provides access for the core rod into the mold cavity. A coating of plastic material is applied to a reduced diameter portion 30 of the core rod; and when air is injected into the core rod 26 and blown through openings in the portion 30 of the core rod, the plastic is expanded by the air into contact with the wall 24 to form a plastic blown article 32 having the shape of the cavity of the mold 10.

FIG. 3 shows the blown article 32 with a wall thickness that is increased by the presence of gas bubbles or cells 34 formed by a blowing agent which is mixed with the plastic when the plastic is compounded. The blowing agent is activated by heat; but the size of the gas cells 34 depends upon the pressure to which the plastic is subjected because the gas in the cells is compressible and will occupy less space when the pressure on the plastic is high.

The blown article 32 is ordinarily a container and is formed with a neck and threads on the neck for receiving a closure for the container in accordance with conventional practice. The formulation of plastic and blowing agent is one that produces "closed cells"; that is, the walls between successive cells do not break down so as to put the cells in communication with one another with the result that the expanded foam becomes a sponge. In FIG. 3, the thickness of the wall of the blown article 32 and the size of the gas cells or bubbles 34 are exaggerated for clearer illustration. The size of the cells 34 will expand and contract as the pressure on the molten plastic 34 increases or decreases; but the final size of these cells or bubbles depends upon the pressure on the plastic 34 as it solidifies from a molten mass into a solid material. The solidifying of the plastic sets the bubbles to a final size, and this determines the final thickness of the wall of the blown article 32.

When the plastic article 32 is in the process of being blown, it is in a molten condition and expands into contact with the cooled wall 24 of the mold cavity. Contact with the cavity wall causes a skin to form on the surface of the plastic that is in contact with the cavity wall, and heat is conducted through this skin to the cavity wall so that the molten plastic solidifies as the skin becomes thicker. The term "molten" is used herein to designate a soft condition in which the plastic is viscous and in a softened state through which most thermoplastic materials pass in changing from a solid to a truly liquid condition.

Figure 2:
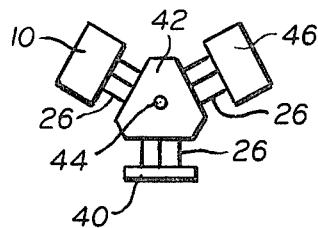
FIG. 2 is a diagrammatic top plan view of injection molding apparatus to which the invention can be applied.

The plastic article 32 is cooled by the adjacent wall 24 until it becomes solid, and the blow mold then opens and the core rod 26 moves from the blowing mold 10 to a stripper station 40 (FIG. 2) to which the core rod 26 is transferred by rotation of an indexing head 42 about a center shaft 44. The injection mold in which the plastic parison was originally applied to the core rod 26 is designated in FIG. 2 by the reference character 46. This apparatus for transferring the core rods successively from an injection mold to a blowing mold and to a stripper station is well known and is the preferred apparatus with which the present invention is used. As stated in the introduction, however, the construction and procedure used in the blowing mold, as described herein, can also be used in blowing molds for extrusion molding.

When the blown article 32 (FIG. 3) originally begins to cool, the plastic shrinks to some extent, and this causes the plastic to have lighter contact with the wall of the mold or to have an actual gap between the plastic and the mold wall. Further heat transfer from the plastic to the cooled wall is thus reduced, and a longer period of time is required for the plastic to solidify sufficiently to permit the blown article 32 to be removed from the blowing mold. This lengthens the cycle of the blow molding apparatus and reduces its production.

This invention helps to prevent the plastic from pulling away from the cooled wall of the mold cavity, even though the gas pressure used for blowing the article 32 is reduced to a low value to permit expansion of the gas cells or bubbles 34 while the plastic is cooling.

Figure 4:
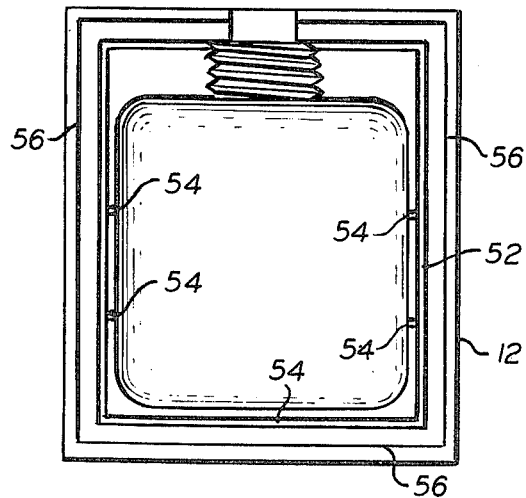
FIG. 4 is a sectional view taken on the line 4—4 of FIG. 3 which represents the plane at which the opposite halves of the blowing mold come together.

This new result is obtained by providing means for drawing a partial vacuum on the inside of the cavity of the mold 10 around the outside of the blown article 32. Referring to the lower part of FIG. 3, grooves 50 and 52 are formed opposite one another in the confronting faces of the mold sections 11 and 12, respectively. These two grooves 50 and 52 provide a manifold which extends around substantially the entire mold cavity, as indicated by the showing of the groove 52 in FIG. 4. FIG. 4 is taken along the section at which the parts 11 and 12 of the mold separate from one another, and it will be understood that the groove 50 is the same in extent on the mold section 11 as the groove 52 is on the mold section 12 in FIG. 4. Smaller grooves 54 extend from the groove 52 into the mold cavity. These grooves 54 are large enough to permit flow of air from within the mold cavity, but too small to permit escape of the molten plastic. A sealing ring 56 provides a gasket which prevents atmospheric air from entering the manifold formed by the grooves 50 and 52.

The apparatus for controlling the pressure in the cavity of the mold 10, both inside and outside of the blown article 32, is shown in FIG. 1. Tubing 60 extends from the section 11 where it communicates with the manifold formed by the grooves 50 and 52. This tube 60 extends to a vacuum tank 62, and there is a solenoid-operated shut-off valve 64 in the tube 60 between the mold 10 and the vacuum tank 62. The core rod 26 is supplied with air pressure from a pressure tank 66. Two different connections 68 and 69 connect the air pressure tank 66 with a common tube 70 which leads to the core rod 26.

There is a pressure regulator 72 and a solenoid-operated valve 74 in the connection 68 between the air pressure tank 66 and the tube 70. The connection 69 contains a pressure regulator 78 in series with a solenoid-operated valve 80, and this connection 69 is in parallel with the first connection 68 for supplying pressure to the tube 70.

Air is pumped into the pressure tank 66 by compressor 82 operated by a motor 84 which receives its power from a pressure-operated switch 86. The pressure chamber of the switch 86 is connected with the tank 66 through a tube 88. The pressure switch 86 is adjustable to start the operation of the motor 84 at any desired minimum pressure which is to be maintained in the tank 66.

The pressure in the vacuum tank 62 is maintained by a vacuum pump 92 driven by motor 94 which receives its power through a pressure-responsive switch 96 having a pressure chamber connected with the vacuum tank 62 through tubing 98. Switch 96 is adjusted to start the operation of the vacuum pump 92 whenever the pressure in the vacuum tank 62 rises above a certain minimum pressure.

At the beginning of a blowing cycle in the mold 10, the valve 80 is closed, and a controller 100, also designated by the reference character C, opens the valve 74 to supply compressed air at the desired blowing pressure to the core rod 26. When the parison has been blown until it contacts with the wall of the mold cavity, the controller 100 closes the valve 74 and opens the valve 80. The pressure regulator 78 is adjusted to supply a lower air pressure to the inside of the blown article, and the delivery pressure for which the regulator 78 is adjusted depends upon the size of bubble which is desired for the particular article being blown in the mold cavity. As previously explained, a higher pressure from the regulator 78 results in smaller size bubbles and a lower pressure will result in larger size bubbles.

The controller 100 opens the valve 64 to draw a partial vacuum on the mold chamber outside of the blown plastic article. This partial vacuum tends to hold the plastic in contact with the wall of the mold cavity as the plastic begins to cool and thus facilitates cooling and shortens the cooling time.

If the mold 10 is one with a very large cavity or plural cavities which make a large total volume, then the controller 100 will be adjusted to open the valve 64 earlier in the blowing cycle so as to evacuate a substantial part of the air within the mold cavity during the expansion of the plastic article so that the article will expand faster for a given inside air pressure.

The volume of the wall of the blown article may be from 30 to more than 50 percent gas bubbles. Thus the control of the pressure to regulate bubble size makes a substantial difference in the thickness of the wall, as previously explained.

The preferred embodiment of the invention has been illustrated and described, but changes and modifications can be made and some features can be used in different combinations without departing from the invention as defined in the claims.

I claim:

1. The method of making plastic blown ware including applying a molten tubular plastic blank to a mold cavity, blowing the plastic blank by supplying gas under pressure to the inside of the plastic blank to expand said plastic blank into contact with the wall of the mold cavity, cooling the mold so that the plastic forms a skin on the outside of the blank upon contact with the mold, and evacuating air from the mold cavity around the outside of the plastic blank to expedite the expansion of the plastic blank into contact with the wall of the mold cavity, characterized by supplying to the mold cavity a plastic blank that contains a blowing agent that expands the plastic by the formation of gas bubbles therein to produce an expanded or foamed wall for the plastic blank, formulating the plastic material and blowing agent to obtain a closed-cell foam, and reducing the pressure of the gas that blows the plastic blank immediately after the plastic blank has expanded into contact with the wall of the mold, and controlling the reduction in gas pressure to obtain a desired size of bubble within the plastic while the plastic is cooling to a hard condition in which the bubble size becomes set.

2. The method described in claim 1 characterized by applying the molten plastic to a core rod in an injection mold to form a plastic tubular blank as a parison on the core rod, transferring the core rod and parison to a cavity of a blowing mold, injecting the gas under pressure through the core rod to the inside of the tubular parison on the core rod to blow the plastic into contact with the wall of the mold cavity, cooling the cavity wall, and maintaining more intimate contact of the plastic with the cavity wall, to facilitate heat transfer from the plastic to the cavity wall, by maintaining a partial vacuum in the cavity outside of the article blown from the plastic blank.

* * * * *